United States Patent Office 3,376,247
Patented Apr. 2, 1968

3,376,247
SLIP CASTING COMPOSITION WITH CYCLO-
PENTADIENE AS A DEFLOCCULANT
Richard L. Reddy, Lewiston, N.Y., and Lionel C. Montgomery, North Olmsted, and Carl A. Grulke, Berea, Ohio, assignors to Union Carbide Corporation, a corporation of New York
No Drawing. Filed Aug. 12, 1964, Ser. No. 389,203
3 Claims. (Cl. 260—32.8)

ABSTRACT OF THE DISCLOSURE

A slip is provided for slip casting refractory materials which comprises a finely divided solid refractory material suspended in a liquid vehicle having a minor proportion of polymeric cyclopentadiene dissolved therein as a deflocculant.

---

The present invention relates to slip casting. More particularly, the present invention relates to a novel slip for use in the casting of refractory materials such as molybdenum, titanium diboride and other refractory materials hereinafter described.

In conventional slip casting practice, the material to be cast is milled or otherwise processed to render it into a finely divided state, e.g., to an average particle size of 1 to 3 microns. The finely divided material is then mixed with a liquid suspending medium to form what is known as a slip and the slip is poured into a suitable mold, e.g., a plaster of Paris mold. In the mold the liquid in the slip is drawn into the mold by capillary action and the solids are deposited in coherent form.

Various suspending media which are presently employed in preparing slips include water, acetone, benzene, kerosene, alcohol, and the like. For effective casting, it has been found that the slip should be stable, and have a high solids content. Also, the slip should have good flowability and the solid and liquid constituents of the slip should not chemically react with each other.

Further, the liquid slip constituents should not adversely affect the strength and other properties of the green casting or final sintered casting.

Additionally, it is highly desirable that the suspending medium be compatible with a wide variety of casting materials. Further it is important that slips be uniformly reproducible particularly as regards density, casting time required, viscosity and green density of the casting.

It has been found however, that with water base slips of refractory materials it has been practically impossible to cast articles having satisfactory properties due to the fact that most refractory materials contain intrinsic impurities which react with water to generate reaction products which adversely affect the physical integrity of the resultant article. With other suspending media, it has been previously necessary to develop different slip systems, using different deflocculants for the different refractory materials in order to obtain suitable castings. That is to say, no single slip system has previously been compatible with a wide range of refractory materials.

It is therefore an object of the present invention to provide a slip casting process for making strong, dense castings of refractory materials.

It is another object of the present invention to provide a stable slip for the casting of a wide variety of refractory materials.

Other objects will be apparent from the following description and claims.

A slip in accordance with the present invention is a suspension of finely divided solid material in a liquid having polymeric cyclopentadiene dissolved therein. Particularly advantageous results and benefits are obtained in the present invention with the nitrides, carbides and borides of titanium, tungsten, molybdenum, zirconium, aluminum and chromium. One important benefit is that the articles prepared from these materials in accordance with the present invention have physical properties at least equivalent to those of articles prepared by hot pressing techniques.

Particular refractory materials which can be made into stable slips in accordance with the present invention are listed in Table I. For purposes of the present invention carbon is considered a refractory material.

Also shown in Table I are highly suitable sizing ranges for refractory materials in the practice of the present invention.

In Table II, various suspending media are indicated which can be effectively used in the present invention together with the recommended amounts of deflocculant, i.e., cyclopentadiene, dissolved therein. Other suspending media, e.g., acetone, kerosene, in which cyclopentadiene can be dissolved can also be used. If more than the amount of cyclopentadiene indicated in Table II is used, casting times are generally too long for industrial operations. If less is used, the slips tend to be unstable, leading to settling and poor casting, e.g. nonuniform wall thickness.

TABLE I

| Refractory material: | Average particle size |
|---|---|
| Mo | 1 to 1.5 |
| $ZrB_2$ | 1.5 to 3.0 |
| $CrB_2$ | 1.5 to 3.0 |
| $Si_3N_4$ | 1.5 to 3.0 |
| $ZrO \cdot SiO_2$ | 1.5 to 2.5 |
| AlN | 1.5 to 2.5 |
| TiN | 1.5 to 2.5 |
| SiC | 1.5 to 2.5 |
| TaC | 1.0 to 2.0 |
| $B_4C$ | 1.0 to 2.0 |
| $MoSi_2$ | 1.0 to 2.5 |
| TiC | 1.0 to 2.5 |
| ZrC | 1.0 to 2.5 |
| WC | 1.0 to 2.5 |
| CbC | 1.5 to 2.5 |
| $TiB_2$ | 1.5 to 2.5 |
| $TiB_2$+50w/o C | 1.5 to 2.5 |
| $TiB_2$+50w/o AlN | 1.5 to 2.5 |
| $TiB_2$+30w/o AlN | 1.5 to 2.5 |
| $TiB_2$+50w/o BN | 1.5 to 2.5 |
| $TiB_2$+50w/o TiC | 1.5 to 2.5 |
| $TiB_2$+50w/o TaC | 1.5 to 2.5 |
| $TiB_2$+3w/o $CrB_2$ | 1.5 to 2.5 |
| $TiB_2$+50w/o ZrC | 1.5 to 2.5 |
| $TiB_2$+50w/o WC | 1.5 to 2.5 |
| $TiB_2$+45w/o WC+10w/o Co | 1.5 to 2.5 |
| $TiB_2$+30w/o TiC+20w/o AlN | 1.5 to 2.5 |
| $ZrO_2$ | 1.5 to 2.5 |
| Ir | 1.0 to 1.5 |
| Rh | 1.0 to 1.5 |
| C | 1.0 to 1.5 |

TABLE II

| Suspending Media: | Cyclopentadiene, percent by weight |
|---|---|
| Xylene | 5–12 |
| Toluene | 5–12 |
| Benzene | 5–12 |
| Highflash naphtha | 5–12 |
| Solvent naphtha | 5–12 |
| Alcohol | 5–12 |

The polymeric material which serves as a deflocculant and forms an essential part of the present invention is low molecular weight polycyclopentadiene, preferably, predominantly in the form of dimers and quartimers of dicyclopentadiene.

The formula below represents the polymeric material suitable in the practice of the present invention:

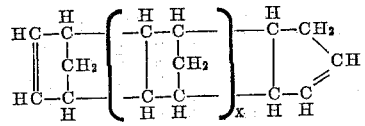

where $x = 2$ to 6.

It has been discovered as part of the present invention that the presence of dissolved cyclopentadiene in the slip suspending media provides the following advantages:

(1) Stable high solids content slips can be produced with a wide variety of refractory materials, (2) The slips produced have a long shelf life, e.g., shapes can be cast 24 hours or more after the original preparation of the slip, (3) Chemical contamination of the slip is avoided since the slip system, i.e., suspending media plus cyclopentadiene, can be completely volatilized during sintering, (4) The gel-like character of cyclopentadiene improves the thixotropic properties of the slip, (5) The specific wetting or detergent property of cyclopentadiene causes intimate coating of the suspended solids, (6) The gel formation of cyclopentadiene which occurs during drying has the effect of knitting and densifying the suspended material.

A particular advantage of the present invention is that cyclopentadiene deflocculant is a non-oxygen containing polymer which is also water repellent and upon heating forms a shrinking gel which increases the density of the cast article. At or about 350° C. the polymer reverts to the monomer and leaves the casting, carrying any traces of oxygen with it. The solid particles thus can sinter to produce a uniquely pure particle to particle bonding at relatively low temperatures.

By way of example, in the practice of the present invention, the slip casting of say, titanium diboride, is accomplished by dry milling titanium diboride powder to about 2.5 microns average particle size.

The milled powder is then formed into a slip by mixing with a suspending media, e.g., xylene and cyclopentadiene. The mixing is continued until the slurry is free of agglomerated particles. Usually 2 hours of mixing are required for this purpose. Suitable proportions for the slip constituents are:

|  | Ratio by Voume | Ratio by Weight |
|---|---|---|
| Titanium Diboride | 49.7 | 84.0 |
| Suspending Media | 42.7 | 13.6 |
| Cyclopentadiene | 7.6 | 2.4 |

A slip prepared in the manner aforedescribed, by virtue of the inclusion of cyclopentadiene as a slip constituent, is characterized by the ability to remain suspended for at least a 24-hour period, a high solids content which ensures a high green density and minimum shrinkage during drying, the formation of a strong green casting that is easily machinable and which is essentially uncontaminated after sintering.

After preparation as aforedescribed, the slip is poured into a plaster of Paris mold and a coherent layer of solid material is permitted to develop to the desired thickness after which the remaining liquid portion of the slip is drained from the mold.

The thus cast shape is dried in the mold until strong enough to be handled without fracture. With relatively small shapes, e.g., ½ to 1 inch diameter x 3 inches long, about one hour drying time at room temperature is sufficient to provide a suitable green strength to enable routine handling.

With larger shapes, e.g., 1 inch to 6 inch diameter x 18 inches long, about 24 hours drying time at room temperature provides a sufficient strength for handling.

After this initial drying, the shapes are removed from the mold and oven dried and sintered.

A suitable heating schedule is heating from 50° C. to 2000° C. at a rate of 400° C. per hour and holding at 2000° C. for two hours. Preferably, the heating treatment is conducted in a carbon or $TiB_2$ capsule, the slip cast shape being packed therein with BN powder and the heating carried out under flowing argon.

The resulting sintered articles have a density in the range of from 92 to 94 percent of theoretical, an average flexure strength of from 29,000 to 60,000 p.s.i., and a sonic modulus of from 74 to $77 \times 10^6$ p.s.i.

In addition to titanium diboride, the other refractory materials of Table I can be treated in essentially the same manner.

The following Table III shows specific slips which have been prepared and evaluated. All of the slips were stable, i. e., they were capable of remaining suspended for 24

TABLE III.—SIP CAST HIGH TEMPERATURE MATERIALS

| Refractory Material | Suspending Media | Percent Cyclopentadiene in xylene by weight | Solids Content, Percent by Volume | Average Particle Size, Microns | Sintered Density, Percent of Theoretical |
|---|---|---|---|---|---|
| Mo | Xylene | 7 | 27.0 | | |
| $ZrB_2$ | do | 7 | 50.9 | | 89 |
| $CrB_2$ | do | 7 | 53.8 | 2.2 | |
| $Si_3N_4$ | do | 7 | 56.5 | 2.9 | |
| $ZrO.SiO_2$ | do | 7 | 50.0 | | |
| AlN | do | 7 | 42.8 | 0 | |
| TiN | do | 7 | 49.0 | | |
| SiC | do | 7 | 54.0 | 2.5 | |
| TaC | do | 5 | 37.4 | 1.5 | 93 |
| $B_4C$ | do | 7 | 59.0 | 2.4 | |
| $MoSi_2$ | do | 7 | 50.0 | | |
| TiC | do | 5 | 40.9 | 2.0 | 88 |
| ZrC | do | 5 | 42.0 | 2.5 | 94 |
| WC | do | 5 | 38.0 | 1.0 | 93 |
| CbC | do | 5 | 63.0 | | 96 |
| $TiB_2$ | do | 5 | 44.5 | 2.5 | 92–94 |
| $TiB_2$ +50w/o C | do | 7 | 11.0 | | |
| $TiB_2$ +50w/o AlN | do | 7 | 43.5 | | |
| $TiB_2$ +30w/o AlN | do | 7 | | | 87 |
| $TiB_2$ +50w/o BN | do | 10 | 31.6 | | |
| $TiB_2$ +50w/o TiC | do | | 43.9 | | |
| $TiB_2$ +50w/o TaC | do | | 35.5 | | 85 |
| $TiB_2$ +3w/o $CrB_2$ | do | | 44.5 | | 90 |
| $TiB_2$ +50w/o ZrC | do | | 47.4 | | 90 |
| $TiB_2$ +50w/o WC | do | | 34.4 | | |
| $TiB_2$ +45w/o WC+10w/o Co | do | | | | |
| $TiB_2$ +30w/o TiC+20w/o AlN | do | | | | |
| ZrO | do | | 44.4 | 1.5 | |
| Ir | do | | 20.0 | 1 | |
| RH | do | | 27.5 | | |
| C | do | | 23.5 | 1.5 | | hours or more and when cast exhibited high green strength and density. Sintered densities and strengths were also high.

The slips were prepared by milling refractory material with the indicated amounts of suspending media and cyclopentadiene. The respective slips were then poured into plaster of Paris mold and green castings were obtained in the form of crucibles about 5 inches in diameter and 5 inches in height. The green castings were dried and sintered in accordance with the following schedule:

(1) Room temperature drying for about 24 hours followed by further drying at 50° C. for 3 hours, (2) Sintering temperatures between 1700 and 2200° C. depending on the refractory material, higher temperatures being used with the higher melting materials. The heating rate to temperature was 400° per hour followed by a holding time at sintering temperature of from one to three hours.

In addition to those previously mentioned, the present invention provides significant industrial advantages as regards reproducibility. For example, four different xylene base slips containing cyclopentadine were prepared using the same refractory material having an average particle size of 2.5 microns. The amounts of xylene, cyclopentadiene and refractory material were the same for all slips.

The separate slips were then cast into crucibles and sintered under identical conditions to determine the uniformity of characteristics. The results are shown in Table IV.

TABLE IV

| | Crucible Number | | | |
|---|---|---|---|---|
| | 1 | 2 | 3 | 4 |
| Green Density, Percent of Theoretical | 65.0 | 65.5 | 65.0 | 65.3 |
| Sintered Density, Percent of Theoretical | 94.0 | 94.5 | 93.7 | 94.6 |

What is claimed is:

1. A slip for use in casting comprising finely divided solid refractory material dispersed in a liquid containing from 5 to about 12 percent by weight of dissolved polymeric cyclopentadiene having the following structural formula:

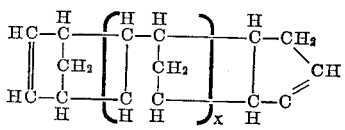

where $X=2$ to 6.

2. A slip for use in casting comprising finely divided solid material having an average particle size of from 1 to 3 microns dispersed in a liquid containing from 5 to 12 percent by weight of dissolved polymeric cyclopentadeine having the following structural formula:

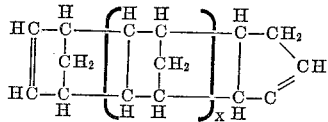

where $X=2$ to 6; said liquid being selected from the group consisting of xylene, toluol, kerosene, benzene, naphtha, acetone, and alcohol.

3. A slip for use in casting comprising finely divided solid material having an average particle size of from 1 to 3 microns dispersed in a liquid containing from 5 to 12 percent by weight of dissolved polymeric cyclopentadiene having the following structural formula:

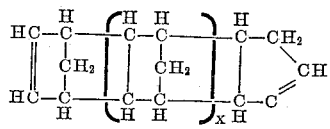

where $X=2$ to 6; said liquid being selected from the group consisting of xylene, toluol, kerosene, benzene, naphtha, acetone, and alcohol and said solid material being at least one material selected from the group consisting of the nitrides, carbides and borides of titanium, tungsten, molybdenum, zirconium, chromium and aluminum.

References Cited

UNITED STATES PATENTS 2,979,401  4/1961  Szymaszek _____ 264—86
2,734,031  2/1956  McNaughtan _____ 260—93.1

MORRIS LIEBMAN, *Primary Examiner.*

JULIUS FROME, *Examiner.*

R. S. BARON, *Assistant Examiner.*

UNITED STATES PATENT OFFICE
CERTIFICATE OF CORRECTION

Patent No. 3,376,247　　　　　　　　　　　　　　April 2, 1968

Richard L. Reddy et al.

It is hereby certified that error appears in the above numbered patent requiring correction and that the said Letters Patent should read as corrected below.

Columns 5 and 6, the formulas, each occurrence, should appear as shown below:

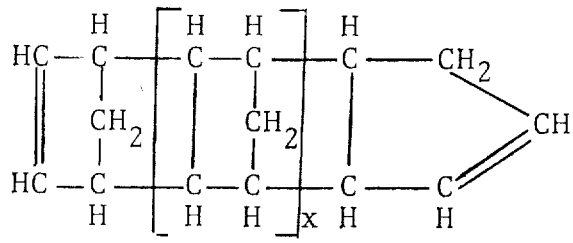

Signed and sealed this 16th day of September 1969.

(SEAL)
Attest:

EDWARD M.FLETCHER,JR.　　　　　　　WILLIAM E. SCHUYLER, JR.
Attesting Officer　　　　　　　　　　Commissioner of Patents